(12) United States Patent
Homan et al.

(10) Patent No.: US 8,441,261 B2
(45) Date of Patent: May 14, 2013

(54) DETERMINATION OF CONDUCTIVE FORMATION ORIENTATION BY MAKING WELLBORE SONDE ERROR CORRECTION

(75) Inventors: Dean Homan, Sugar Land, TX (US); Wich Wichers, Westbeemster (NL); Hanming Wang, Sugar Land, TX (US); Robert Leveridge, Worcester Park (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 388 days.

(21) Appl. No.: 12/817,060

(22) Filed: Jun. 16, 2010

(65) Prior Publication Data

US 2011/0309834 A1 Dec. 22, 2011

(51) Int. Cl.
*G01V 3/00* (2006.01)
*G01V 1/40* (2006.01)

(52) U.S. Cl.
USPC ............... 324/339; 324/348; 324/351; 702/7

(58) Field of Classification Search ........................ None
See application file for complete search history.

(56) References Cited

U.S. PATENT DOCUMENTS

| | | | |
|---|---|---|---|
| 6,891,376 B2 * | 5/2005 | Hanstein et al. ............... | 324/333 |
| 7,027,923 B2 * | 4/2006 | Barber et al. ..................... | 702/7 |
| 7,272,503 B2 * | 9/2007 | Strack et al. ..................... | 702/7 |
| 7,657,377 B2 | 2/2010 | Sinclair et al. | |
| 8,200,437 B2 * | 6/2012 | Davydycheva et al. ........... | 702/7 |
| 2003/0030439 A1* | 2/2003 | Gao et al. ..................... | 324/339 |
| 2003/0229450 A1* | 12/2003 | Strickland ..................... | 702/10 |
| 2006/0038571 A1 | 2/2006 | Ostermeier et al. | |
| 2007/0256832 A1 | 11/2007 | Hagiwara et al. | |
| 2010/0082255 A1* | 4/2010 | Davydycheva et al. ........... | 702/7 |

OTHER PUBLICATIONS

International Search Report and Written Opinion for International Application No. PCT/US2011/039256 dated Dec. 28, 2011.

* cited by examiner

*Primary Examiner* — Vinh Nguyen
(74) *Attorney, Agent, or Firm* — Darla P. Fonseca (57) ABSTRACT

A method for determining orientation of an electrically conductive formation proximate an electrically substantially non-conductive formation includes measuring multiaxial electromagnetic induction response within the substantially non-conductive formation using an instrument disposed in a wellbore drilled through the formations. A difference from zero conductivity is determined for each component measurement of the multiaxial electromagnetic induction response. The differences are used to correct the measured response of each component measurement in the electrically conductive response. The corrected component measurements are used to determine the orientation of the conductive formation.

20 Claims, 6 Drawing Sheets

DETERMINATION OF CONDUCTIVE FORMATION ORIENTATION BY MAKING WELLBORE SONDE ERROR CORRECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic induction well logging instruments and methods. More particularly, the invention relates to methods for correcting multiaxial induction measurements for "sonde error" effects, and for using the sonde error corrected measurements for more accurately determining dip of conductive rock formations.

2. Background Art

Electromagnetic induction well logging has as one particular purpose the determination of electrical resistivity of rock formations. Electrical resistivity is related to parameters of interest of such formations, including fractional volume of pore space of the formation and the fluid content of the pore spaces. Generally, electromagnetic induction well logging includes moving an instrument along a wellbore drilled through rock formations. The instrument includes one or more transmitter antennas (typically in the form of wire coils) and one or more receiver antennas (also typically in the form of wire coils). Alternating current is passed through the transmitter(s) and signals are detected from the receiver(s) related to voltages induced in the receivers by electromagnetic induction. Characteristics of the induced voltages, for example, amplitude and phase with respect to the transmitter current, are related to the electrical resistivity (conductivity) of the rock formations. Typical induction logging instruments include a plurality of transmitters and receivers spaced apart from each other at selected distances along the length of the instrument so that characteristics of the rock formations may be investigated at a plurality of lateral distances ("depths of investigation") from the longitudinal axis of the wellbore.

Electromagnetic induction instruments and methods of interpreting the measurements made therefrom include a device used to provide services under the trademark RT SCANNER, which is a trademark of the assignee of the present invention. The foregoing instrument includes a plurality of "multiaxial" antennas, meaning that the antennas each have dipole moments oriented along a plurality of different axes. Each of the multiaxial antennas in the foregoing instrument has a wire coil arranged so that its magnetic dipole moment is along the longitudinal axis of the instrument, and two additional, substantially collocated wire coils arranged so that their dipole moments are substantially perpendicular to the axis of the instrument, and substantially perpendicular to each other. Such antennas may be referred to as "triaxial" antennas. One of the triaxial antennas is used as the transmitter, and a plurality of triaxial coils used as receiver antennas are spaced along the instrument at selected longitudinal distances from the transmitter. The particular arrangement of antennas in any example is not intended to limit the scope of the present invention.

An important purpose for the foregoing induction well instrument is to be able to determine resistivity of rock formations both parallel to the direction of layers of the rock formation ("bedding planes") and in directions perpendicular to the bedding planes. It is known in the art that certain rock formations consist of a plurality of layers of porous, permeable rock interleaved with layers of substantially impermeable rock including substantial volume of clay minerals. Such formations, referred to as "laminated" formations, have been known to be productive of hydrocarbons and have quite different resistivity parallel to the bedding planes as contrasted with perpendicular to the bedding planes.

An important part of interpreting measurements from the foregoing type of instrument is to correct the measurements for the effects of the wellbore (which occupies some of the volume of investigation of the various receivers) and for the effects of formations having bedding planes disposed at angles other than perpendicular to the axis of the wellbore. Methods known in the art for determining resistivity of such formations using multiaxial electromagnetic induction measurements are described, for example, in U.S. Patent Application Publication No. 2010/0082255 filed by Davydycheva et al, the underlying patent application for which is assigned to the assignee of the present invention.

In some cases, electrically conductive formations may be disposed within or proximate to electrically substantially non-conductive formations. In such cases, depending on the thickness of the conductive formation, it may or may not be possible to determine the exact value of electrical conductivity (resistivity) using induction type instruments. It has been determined, however that such electrically conductive formations so disposed are still susceptible to determination of their geodetic orientation (dip) because the induction instrument is sensitive to their presence. Methods known in the art, such as described in the '225 publication above may be used to determine the orientations of such formations. Because of the low conductivity of the surrounding formations, however, the dip so determined is subject to accuracy limitations as a result of the relatively low accuracy of the underlying induction measurements in substantially non-conductive formations. One technique to improve accuracy is to correct the response of the instrument for "sonde error", which is a non-zero conductivity output of the instrument when the instrument is disposed in a substantially zero conductivity environment. See, for example, U.S. Pat. No. 7,027,923 issued to Barber et al.

There exists a need for improved methods to determine conductive formation dip wherein there are substantially non-conductive formations present in a wellbore.

SUMMARY OF THE INVENTION

A method according to one aspect of the invention for determining orientation of an electrically conductive formation proximate an electrically substantially non-conductive formation includes measuring multiaxial electromagnetic induction response within the substantially non-conductive formation using an instrument disposed in a wellbore drilled through the formations. A difference from zero conductivity is determined for each component measurement of the multiaxial electromagnetic induction response. The differences are used to correct the measured response of each component measurement in the electrically conductive response. The corrected component measurements are used to determine the orientation of the conductive formation.

A method according to another aspect of the invention for determining orientation of an electrically conductive subsurface formation proximate an electrically substantially non-conductive subsurface formation includes using measured multiaxial electromagnetic induction response within the substantially non-conductive formation at least one transmitter to receiver spacing using an instrument disposed in a wellbore penetrating the subsurface formations. A difference from zero conductivity is determined for each component measurement of the multiaxial electromagnetic induction response made in the substantially non-conductive formation. The differences are used to correct the measured response of each component measurement made in at least one electrically conductive formation. The corrected component measurements are used to determine the orientation of the conductive formation.

Other aspects and advantages of the invention will be apparent from the following description and the appended claims.

DETAILED DESCRIPTION

Figure 1:
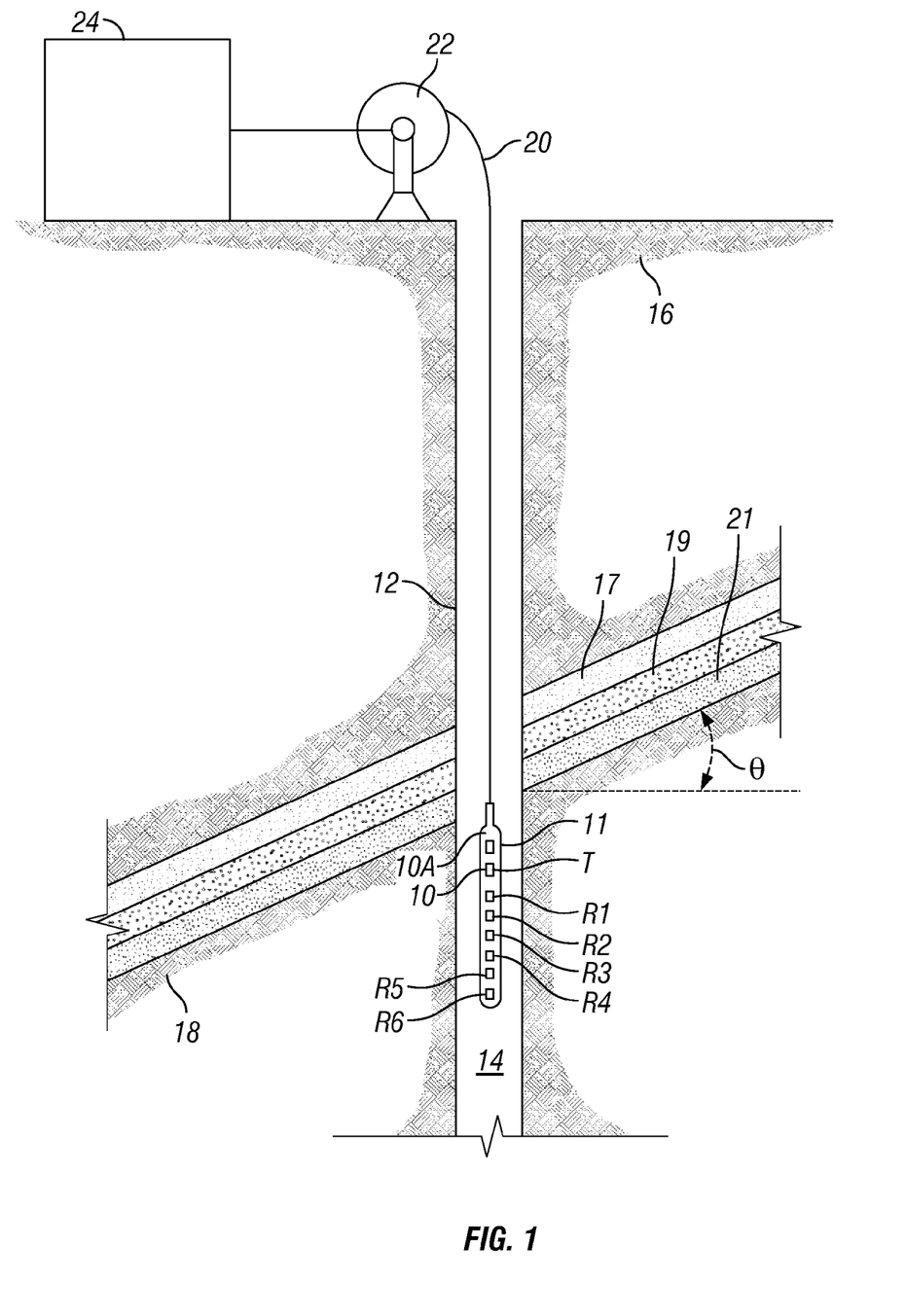
FIG. 1 shows an example of a multiaxial electromagnetic induction well logging instrument disposed in a wellbore drilled through subsurface rock formations.

FIG. 1 shows an example of a multiaxial induction well logging instrument being used to acquire signals for processing according to various aspects of the present invention. The instrument 10 may be moved through a wellbore 12 drilled through subsurface rock formations 16, 18 at the end of an armored electrical cable 20. The cable 20 may be extended into the wellbore 12 and withdrawn from the wellbore 12 to move the instrument 10 using a winch 22 or similar spooling device known in the art. Power to operate the instrument may be provided by a recording unit 24 disposed at the surface and in electrical and/or optical communication with electrical and/or optical conductors (not shown separately) in the cable 20. Signals from the instrument 10 may be communicated to the recording unit 24 along the cable 20.

The instrument 10 may include a generally elongated housing 10A configured to move along the wellbore 12. In the present example, the instrument 10 may include a triaxial transmitter antenna T and a plurality of spaced apart triaxial receiver antennas R1 through R6 disposed at selected positions from the transmitter T. Details of the transmitter and receiver antennas will be explained further below with reference to FIG. 2. While the present example includes one transmitter and six spaced apart receivers, the number of transmitters and receivers is not a limit on the scope of the present invention. The instrument 10 will typically include circuitry, shown generally at 11, for conducting electrical current through the transmitter T and detecting voltages induced in the receivers R1 through R6. Signals corresponding to the detected voltages may be formatted for transmission to the recording unit 24 for recording and interpretation.

The wellbore 12 may be filled with liquid 14 called "drilling mud" used during the drilling of the wellbore 12. In some examples, the drilling mud 14 may have as its continuous phase an electrically non-conductive material such as oil. Other examples may have water as the continuous phase and are thus electrically conductive. It is expected that wellbores having therein oil based drilling mud may provide better results because in such cases there is substantially no induction signal originating in the wellbore, however it is also expected that electrically conductive drilling mud will still provide useful results. As will be further explained below, measurements made by the instrument 10 under certain wellbore conditions may be used to correct other measurements made by the instrument 10 for "sonde error" (non-zero conductivity measurement in an environment that is substantially zero conductivity. Such correction has as its purpose improvement of accuracy of determining formation orientation ("dip") where relatively thin, electrically conductive formations are disposed proximate or within electrically non-conductive or substantially non-conductive formations.

One of the rock formations shown at 18 may be electrically conductive and may consist of one or more discrete layers, shown generally at 17, 19 and 21. The layers 17, 19, 21 may be substantially electrically conductive. An adjacent formation 28 may be substantially electrically non-conductive. As shown in FIG. 1, it is also the case that the bedding planes of the conductive formation 18 will intersect the wellbore 12 other than perpendicularly. Methods according to various aspects of the invention are intended to resolve the geodetic direction of the conductive layers 17, 19, 21 or similar electrically conductive formations disposed within or proximate to electrically substantially non-conductive formations. To determine geodetic direction, the relative direction with respect to the wellbore axis may be determined, and the wellbore axis geodetic direction may be determined. The two directions are combined to determine the geodetic orientation ("dip") of the conductive layers.

Although the wellbore 12 is shown in FIG. 1 as being approximately vertical, as is known in the art, wellbores are commonly drilled along trajectories that include non-vertical or even horizontal portions. The angle of intersection of the conductive layers of the formation 18, i.e., the "dip", is indicated by $\theta$. The angle of intersection is a result of a combination of the inclination of the wellbore 12 from vertical and the geodetic attitude ("dip") of the conductive layers of the formation 18.

Figure 2:
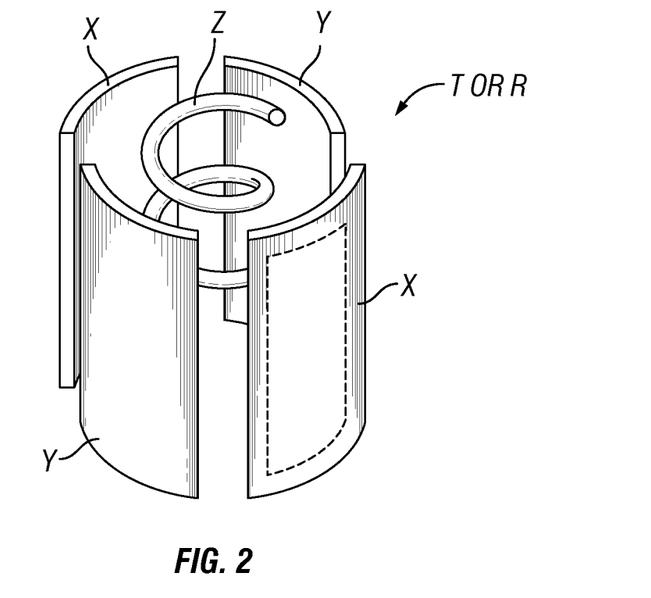
FIG. 2 shows an example of a triaxial induction coil that may be used in various examples of a well logging instrument as in FIG. 1.

FIG. 2 shows an example of a triaxial coil that may be used for one or more of the transmitter (T in FIG. 1) or receivers (R1 through R6 in FIG. 1). The coil may include two "saddle" type coils arranged to conform approximately to the shape of the instrument housing (10A in FIG. 1). The saddle type coils may enclose areas on opposite sides of the housing (10A in FIG. 1) so as to have dipole moment oriented substantially perpendicular to the axis of the instrument (10 in FIG. 1) and substantially perpendicular to each other. Two such enclosed areas are shown respectively at X and Y in FIG. 2. The triaxial coil may also include a solenoid type coil, shown at Z that has dipole moment substantially coaxial with the axis of the instrument. The coil arrangement shown in FIG. 2 provides magnetic dipoles along each of three mutually orthogonal axes having a common midpoint therebetween.

For purposes of explaining the invention, the various measurements made by each of the receivers (R1 through R6 in FIG. 1) may be identified by the particular one of the coils that was energized at the transmitter and the particular one of the coils at each receiver for which a corresponding voltage is detected. Thus, for each receiver (R1 through R6 in FIG. 1), there are nine component measurements: a detected voltage for each of the X, Y and Z receiver coils corresponding to energizing of each of the X, Y and Z transmitter coils. In the explanation below, each component measurement will be identified by a letter pair corresponding to the particular transmitter coil and the particular receiver coil. The nine component measurements are thus identifiable by the references XX, XY, XZ, YX, YY, YZ, ZX, ZY, ZZ. Component measurements that use the same transmitter and receiver dipole moment directions, i.e., XX, YY, ZZ are typically referred to as "direct coupled" component measurements. Component measurements that use a different transmitter dipole moment than the one used for the receiver, e.g., XY, XZ, YX, YZ, ZX, ZY, are typically referred to as "cross component" or "cross coupled" measurements.

Figure 3:
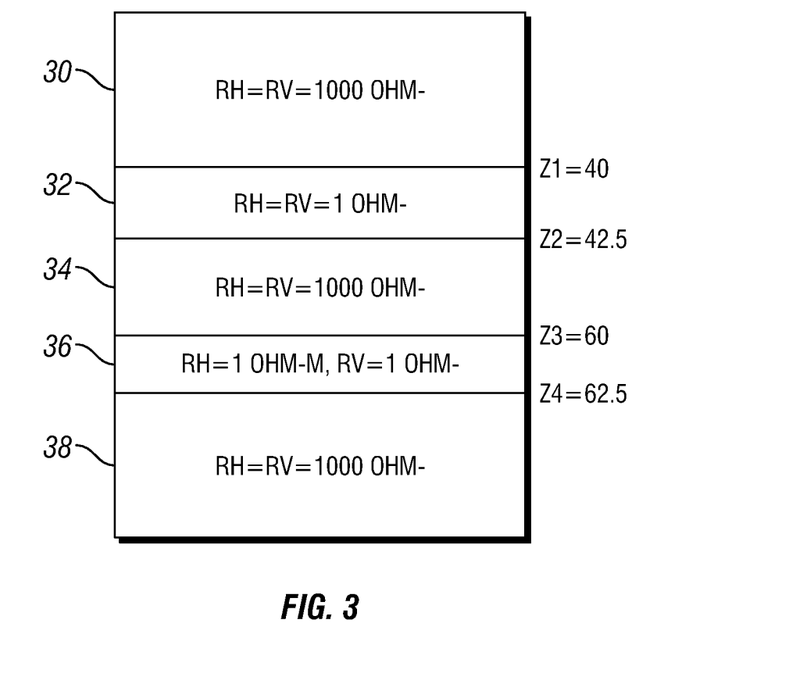
FIG. 3 shows an example layered formation including two electrically conductive layers disposed at a selected dip angle within substantially electrically non-conductive formations.

FIG. 3 shows an example formation having two electrically conductive layers, 32 and 36, disposed within electrically substantially non-conductive formations, 30, 34, 38. The example in FIG. 3 includes that the dip magnitude of the conductive formations is 75 degrees from horizontal and the geodetic direction (azimuth) of the dip is zero (geodetic north).

A simulation of the response of one of the receivers (e.g., one spaced at 39 inches from the transmitter) for each of the nine components described above is shown in FIG. 4. As is typical, several of the component measurements are insensitive to the conductive formations, while other components show substantial sensitivity.

Figure 4:
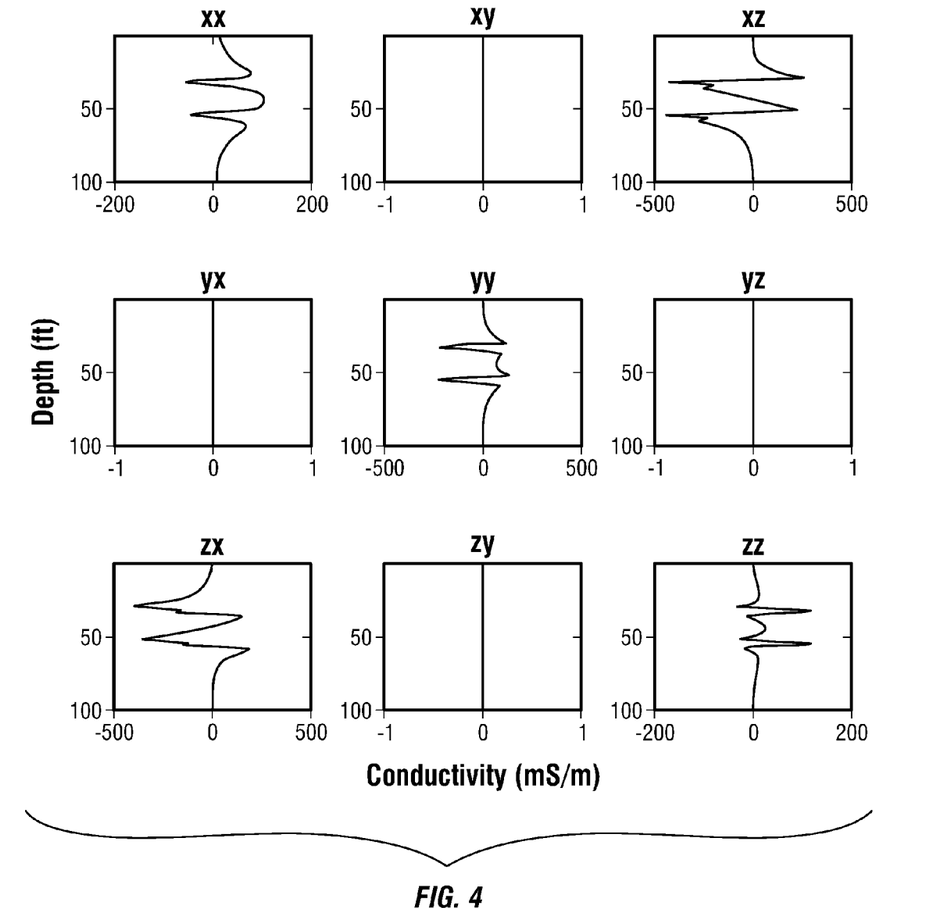
FIG. 4 shows each of the nine component measurements made by the instrument of FIG. 1 from one of the multiaxial receivers.
Figure 5:
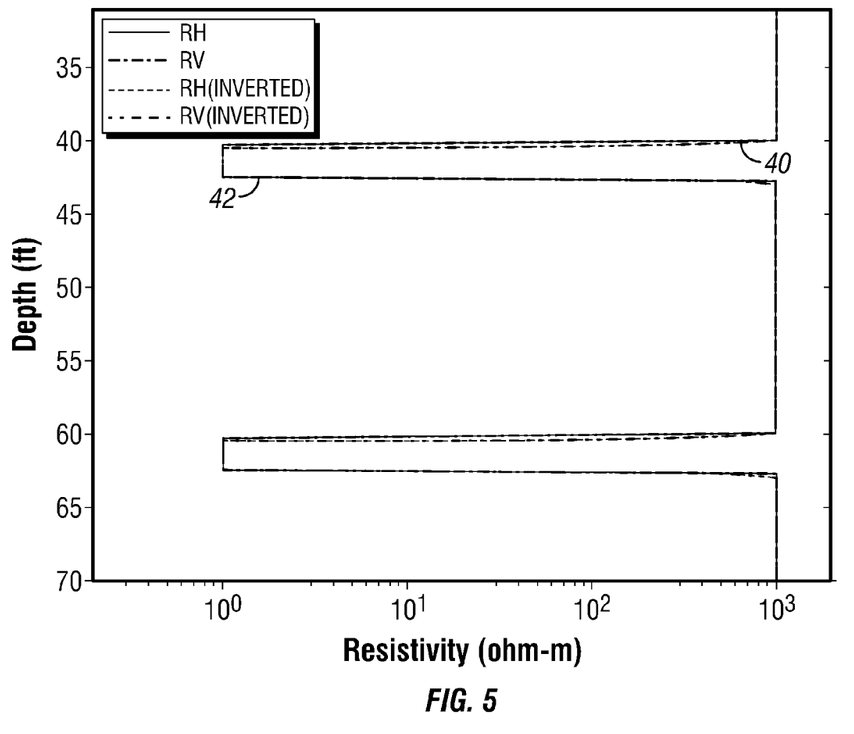
FIG. 5 shows a comparison of dip computed by inversion processing the component measurements shown in FIG. 4 with the actual dip used in the example of FIG. 3.

In one example implementation of the present invention, the method described in the Davydycheva et al. '225 publication referred to in the Background section herein may be used with measurements made by the instrument shown in FIG. 1 to resolve the dip of electrically conductive formations proximate or within electrically non-conductive formations. For the example formations shown in FIG. 3, a result processed according to the foregoing or similar method may provide results as shown in FIG. 5, wherein the simulated dip and azimuth are shown at curve 40, and the inversion processed dip using the simulated component measurements of FIG. 4 are show at curve 42.

Figure 6:
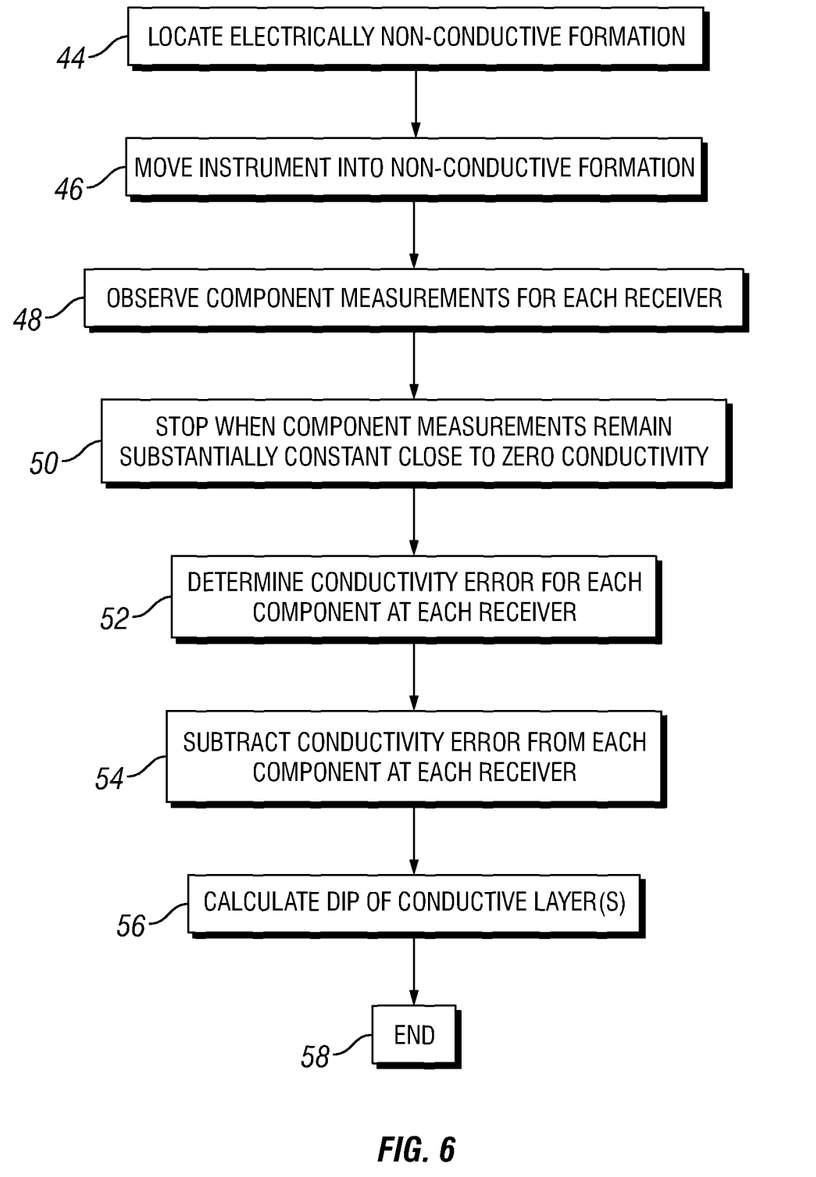
FIG. 6 shows a flow chart of an example of a method according to the invention.

In a method according to the invention, and with reference to FIG. 6, dip results obtained using the method in the '225 publication may be substantially improved by the following procedure. At 44, an electrically non-conductive or substantially non-conductive formation is located. Such location may be made during the movement of the instrument through the wellbore as shown in FIG. 1, or may be determined in processing recorded data from the instrument. Processing may be performed on a computer in the recording unit (24 in FIG. 1) or other computer. The instrument may be moved into the non-conductive or substantially non-conductive formation at 46, or such movement may be noted in processing as explained above. The nine component conductivity curves for each receiver may be observed at 48. When it is observed that the component curves become substantially constant at a value proximate zero, movement of the instrument may be stopped, or further examination of the recorded signals may be stopped at the relevant axial position (depth) in the wellbore. Because of imperfections in the manufacture of the instrument, even when disposed in an absolute zero conductivity environment, the component measurements from each receiver may indicate a non-zero value of conductivity. Such non-zero value is known as the "sonde error." In the present example, sonde error may be determined at 52 as the non-zero measurement from each component of each receiver in what is a substantially zero conductivity environment. The value of sonde error for each component of each receiver may then be subtracted from any portion or all of the recorded signals made from each component of each receiver (or subsets of the receivers). The measurements so adjusted may be referred to as "wellbore sonde error corrected measurements." In particular, the wellbore sonde error corrected measurements may be used with an inversion technique such as described in the '225 publication or similar technique, to obtain the dip of the conductive layer(s), e.g., 17, 19, 21 in FIG. 1. For the RT SCANNER instrument identified above, a non-conductive formation of about fifty foot thickness (13 meters) is expected to be sufficient to avoid influence of adjacent conductive formations on the sonde error correction technique explained above.

Figure 7:
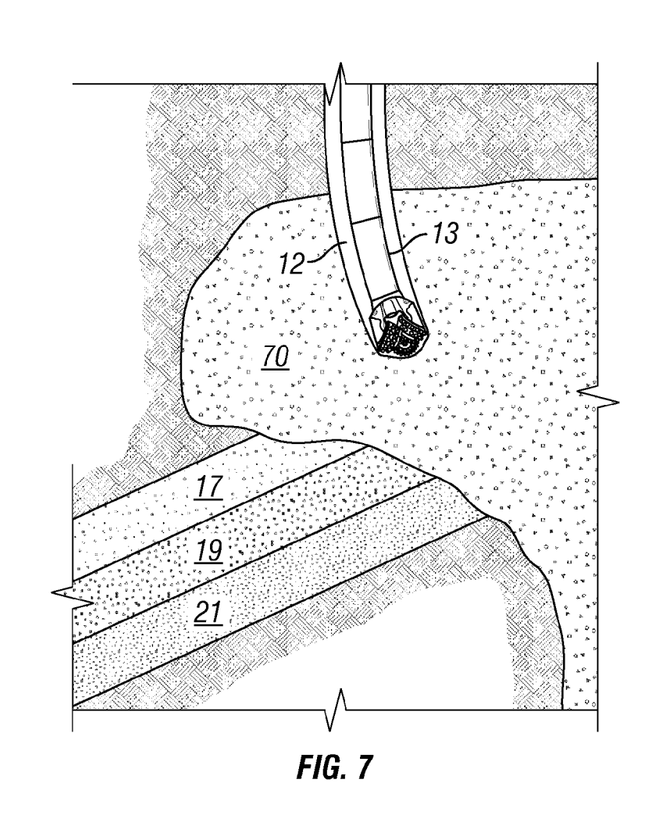
FIG. 7 shows using a method according to the invention to determine drilling direction to cause a wellbore to exit a salt structure.

The foregoing technique has several possible advantageous uses. FIG. 7 shows the wellbore 12 being drilled part way through a salt structure 70. Using the method according to the invention, it may be possible to determine the dip of conductive layers 17, 19, 21 pierced by the salt structure in the geologic past, and to provide an indication of the direction needed to change the trajectory of the wellbore 12, for example using a directional drilling assembly 13 to cause the wellbore 12 to most efficiently exit the salt structure 70.

Figure 8:
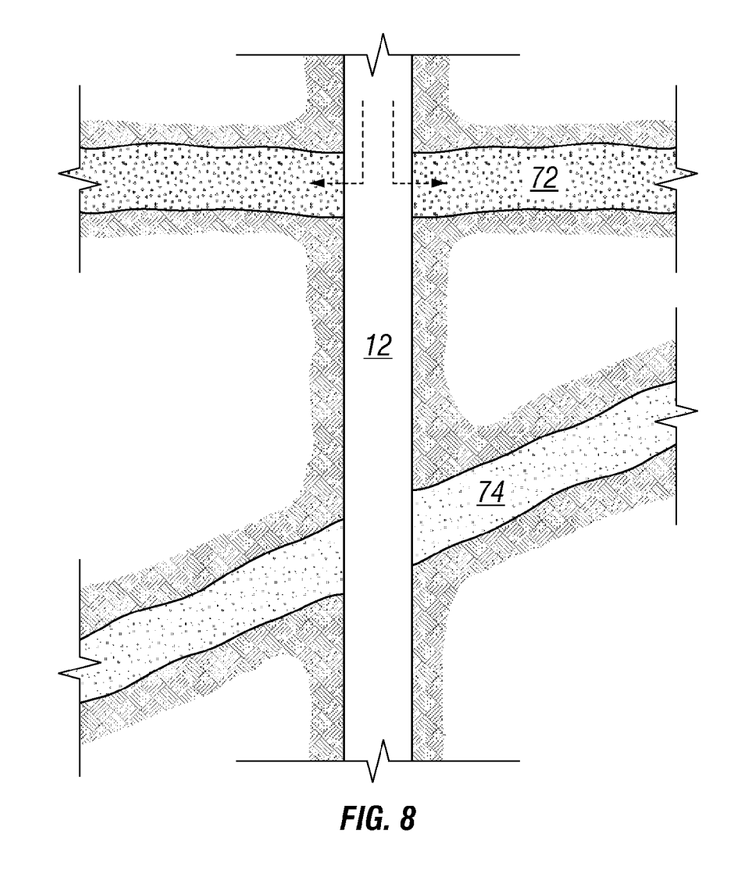
FIG. 8 shows using a method according to the invention to determine dip of lost circulation zones and/or fractured formations.

FIG. 8 shows an example of two other possible advantageous uses of a method according to the invention. Some porous rock formations, e.g., 72 in FIG. 8, may have fluid pressure in the pore space substantially lower than the hydrostatic pressure of the drilling fluid in the wellbore 12. Such formations are known to have fracture pressures that may also be lower than the hydrostatic pressure of the drilling fluid. As shown in FIG. 8, such formations may be permeated by drilling fluid in the wellbore, causing "lost circulation". The geodetic direction of such formation away from the wellbore may be determined using the dip determination method as explained above. Such dip determination may enable avoidance of the lost circulation formation 72 when drilling a wellbore from a different surface location or along another trajectory ("offset well").

Some formations may be hydraulically fractured, such as by pumping fluid into the formation at a pressure above the fracture pressure thereof. One such formation is shown in FIG. 8 at 74. Other formations may be naturally fractured, e.g., carbonates, or may have secondary porosity induced, for example, by remineralization (e.g., substitution of dolomite for limestone in a carbonate rock matrix structure). Using the dip determination method as explained above, it may be possible to determine the fracture orientation or the secondary porosity orientation. Such knowledge may enable more efficient development of a subsurface reservoir disposed in such formations.

Methods according to the invention may provide more accurate determination of dip of geologic formations using measurements made from a multiaxial induction well logging instrument.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining orientation of an electrically conductive subsurface formation proximate an electrically substantially non-conductive subsurface formation, comprising:

measuring multiaxial electromagnetic induction response within the substantially non-conductive formation at least one transmitter to receiver spacing using an instrument disposed in a wellbore penetrating the subsurface formations;

determining a difference from zero conductivity for each component measurement of the multiaxial electromagnetic induction response;

using the differences to correct the measured response of each component measurement in the electrically conductive response; and using the corrected component measurements to determine the orientation of the conductive formation.

2. The method of claim 1 wherein the orientation is determined by inverting the corrected component measurements.

3. The method of claim 1 wherein the component measurements comprise measurements made by transmitting an electromagnetic signal along each of three mutually orthogonal directions and detecting induced voltage caused by the electromagnetic signal along each of the three mutually orthogonal directions for each transmitted signal.

4. The method of claim 1 wherein the substantially non-conductive formation comprises salt.

5. The method of claim 4 further comprising determining a change in wellbore trajectory to enable continued drilling of the wellbore to exit the salt.

6. The method of claim 1 wherein the substantially non-conductive formation comprises a carbonate.

7. The method of claim 6 wherein the conductive formation comprises at least one fracture in the carbonate.

8. The method of claim 6 wherein the conductive formation comprises at least one zone of secondary porosity in the carbonate.

9. The method of claim 8 wherein the secondary porosity is formed by remineralization of the carbonate.

10. The method of claim 1 wherein the conductive formation comprises a lost circulation zone.

11. A method for determining orientation of an electrically conductive subsurface formation proximate an electrically substantially non-conductive subsurface formation from measured multiaxial electromagnetic induction response within the substantially non-conductive formation at least one transmitter to receiver spacing using an instrument disposed in a wellbore penetrating the subsurface formations, the method comprising:

determining a difference from zero conductivity for each component measurement of the multiaxial electromagnetic induction response made in the substantially non-conductive formation;

using the differences to correct the measured response of each component measurement made in at least one electrically conductive formation; and using the corrected component measurements to determine the orientation of the conductive formation.

12. The method of claim 11 wherein the orientation is determined by inverting the corrected component measurements.

13. The method of claim 11 wherein the component measurements comprise measurements made by transmitting an electromagnetic signal along each of three mutually orthogonal directions and detecting induced voltage caused by the electromagnetic signal along each of the three mutually orthogonal directions for each transmitted signal.

14. The method of claim 11 wherein the substantially non-conductive formation comprises salt.

15. The method of claim 14 further comprising determining a change in wellbore trajectory to enable continued drilling of the wellbore to exit the salt.

16. The method of claim 11 wherein the substantially non-conductive formation comprises a carbonate.

17. The method of claim 16 wherein the conductive formation comprises at least one fracture in the carbonate.

18. The method of claim 16 wherein the conductive formation comprises at least one zone of secondary porosity in the carbonate.

19. The method of claim 18 wherein the secondary porosity is formed by remineralization of the carbonate.

20. The method of claim 11 wherein the conductive formation comprises a lost circulation zone.

* * * * *